(12) United States Patent
Akimatsu (10) Patent No.: US 9,802,773 B2
(45) Date of Patent: Oct. 31, 2017

(54) SHEET CONVEYOR AND IMAGE READER (71) Applicant: Brother Kogyo Kabushiki Kaisha, Nagoya (JP)

(72) Inventor: Takayuki Akimatsu, Nagoya (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 0 days.

(21) Appl. No.: 15/181,552

(22) Filed: Jun. 14, 2016

(65) Prior Publication Data

US 2017/0029227 A1 Feb. 2, 2017

(30) Foreign Application Priority Data

Jul. 30, 2015 (JP) .................. 2015-150730

(51) Int. Cl.
*B65H 5/06* (2006.01)
*B65H 5/26* (2006.01)
*B65H 3/06* (2006.01)
*H04N 1/00* (2006.01)
*B65H 5/38* (2006.01)

(52) U.S. Cl.
CPC ........... *B65H 5/068* (2013.01); *B65H 3/0669* (2013.01); *B65H 5/062* (2013.01); *B65H 5/26* (2013.01); *B65H 5/38* (2013.01); *H04N 1/0032* (2013.01); *B65H 2402/522* (2013.01); *B65H 2404/17* (2013.01); *H04N 2201/0094* (2013.01)

(58) Field of Classification Search
CPC ...... B65H 5/06; B65H 5/062; B65H 2404/17; B65H 2404/133; B65H 2402/52; B65H 2402/521; B65H 2402/522
See application file for complete search history.

(56) References Cited

U.S. PATENT DOCUMENTS 6,769,683 B2 * 8/2004 Hiramatsu ............... B65H 5/06
271/274
2016/0362266 A1* 12/2016 Iwasawa ................ B65H 5/062

FOREIGN PATENT DOCUMENTS

| JP | H02-130352 U | | 10/1990 |
| JP | 2000095393 A | * | 4/2000 |
| JP | 2005-219904 A | | 8/2005 |

* cited by examiner

*Primary Examiner* — Luis A Gonzalez
(74) *Attorney, Agent, or Firm* — Burr & Brown, PLLC (57) ABSTRACT

A sheet conveyor includes: a chute which has openings spaced apart from each other in a first direction and guides a sheet; a drive shaft; drive rollers mounted on the drive shaft and each partly protruding from the chute through a corresponding one of the openings; driven rollers each urged and contactable with a corresponding one of the drive rollers; an intermediate bearing disposed at a first position located between adjacent two of the drive rollers; and a holder provided on the chute to hold the intermediate bearing located at the first position. The intermediate bearing is in contact with an outer circumferential surface of the drive shaft when located at a second position different from the first position. The intermediate bearing is slid from the second position to the first position in the first direction and held by the holder at the first position.

18 Claims, 7 Drawing Sheets

SHEET CONVEYOR AND IMAGE READER

CROSS REFERENCE TO RELATED APPLICATION

The present application claims priority from Japanese Patent Application No. 2015-150730, which was filed on Jul. 30, 2015, the disclosure of which is herein incorporated by reference in its entirety.

BACKGROUND

Technical Field

The following disclosure relates to a sheet conveyor and an image reader.

Description of the Related Art

Some image readers include an automatic document feeder (ADF) that includes a roller pair constituted by a drive roller and a driven roller for conveying a sheet downstream in a conveying direction. The driven roller is generally urged toward the drive roller by, e. g., springs, enabling the drive roller and the driven roller to nip and convey the sheet.

SUMMARY

However, when an urging force is applied from the driven roller to the drive roller, a shaft of the drive roller may be bent. This bending may slightly displace the drive roller from a designed position, which may deteriorate conveyance of a sheet. In particular, in a construction in which a chute is provided at a position where the sheet is nipped between the drive roller and the driven roller and in which a sheet conveying path is defined by a guide surface of the chute, relative positions of the guide surface and the rollers may be changed, which may affect the conveyance of the sheet.

Accordingly, an aspect of the disclosure relates to a sheet conveyor and an image reader capable of maintaining appropriate relative positions of a guide surface and rollers.

In one aspect of the disclosure, a sheet conveyor includes: a chute having a first surface and a second surface facing respectively in mutually opposite directions, the chute including a plurality of openings formed through the first surface and the second surface and spaced apart from each other in a first direction perpendicular to a conveying direction, the chute being configured to guide a sheet conveyed from an upstream in the conveying direction, toward a downstream in the conveying direction along the first surface; a drive shaft that is rotated about a rotation axis extending in the first direction; a plurality of drive rollers each mounted on the drive shaft, the plurality of drive rollers facing the second surface of the chute, the plurality of drive rollers each partly protruding from the first surface of the chute through a corresponding one of the plurality of openings; a plurality of driven rollers each of which is rotated about a rotation axis extending in the first direction, the plurality of driven rollers each being urged toward a corresponding one of the plurality of drive rollers, the plurality of driven rollers each being contactable with the corresponding one of the plurality of drive rollers which protrudes from the first surface of the chute; an intermediate bearing disposed at a first position located between two drive rollers of the plurality of drive rollers, the two drive rollers being adjacent to each other in the first direction; and a holder provided on the chute and configured to hold the intermediate bearing located at the first position. The intermediate bearing is in contact with an outer circumferential surface of the drive shaft when located at a second position different from the first position. The intermediate bearing is slid from the second position to the first position in the first direction and held by the holder at the first position.

In another aspect of the disclosure, an image reader includes: a sheet conveyor configured to convey a sheet along a conveyance path; and an image reading device configured to read an image formed on the sheet conveyed by the sheet conveyor. The sheet conveyor includes: a chute having a first surface and a second surface facing respectively in mutually opposite directions, the chute having a plurality of openings formed through the first surface and the second surface and spaced apart from each other in a first direction perpendicular to a conveying direction, the chute being configured to guide a sheet conveyed from an upstream in the conveying direction, toward a downstream in the conveying direction along the first surface; a drive shaft that is rotated about a rotation axis extending in the first direction; a plurality of drive rollers each mounted on the drive shaft, the plurality of drive rollers facing the second surface of the chute, the plurality of drive rollers each partly protruding from the first surface of the chute through a corresponding one of the plurality of openings; a plurality of driven rollers each of which is rotated about a rotation axis extending in the first direction, the plurality of driven rollers each being urged toward a corresponding one of the plurality of drive rollers, the plurality of driven rollers each being contactable with the corresponding one of the plurality of drive rollers which protrudes from the first surface of the chute; an intermediate bearing disposed at a first position located between two drive rollers of the plurality of drive rollers, the two drive rollers being adjacent to each other in the first direction; and a holder provided on the chute and configured to hold the intermediate bearing located at the first position. The intermediate bearing is in contact with an outer circumferential surface of the drive shaft when located at a second position different from the first position. The intermediate bearing is slid from the second position to the first position in the first direction and held by the holder at the first position.

In another aspect of the disclosure, a sheet conveyor includes: a drive shaft that is supported at opposite end portions thereof and rotated about a rotation axis extending in a first direction; a drive roller mounted on the drive shaft; a driven roller that is rotated about a rotation axis extending in the first direction, the driven roller being urged toward the drive roller, the driven roller being configured to cooperate with the drive roller to convey a sheet in a conveying direction, with the sheet nipped between the driven roller and the drive roller at a nipping position; a chute provided upstream or downstream of the nipping position in the conveying direction, the chute being configured to guide the sheet being conveyed; an intermediate bearing disposed at a first position located in a vicinity of a central portion of the drive shaft; and a holder provided on the chute and configured to hold the intermediate bearing located at the first position. The intermediate bearing is in contact with an outer circumferential surface of the drive shaft when located at a second position different from the first position. The intermediate bearing is slid from the second position to the first position and held by the holder at the first position.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Hereinafter, there will be described one embodiment by reference to the drawings.

Construction of MFP

Figure 1:
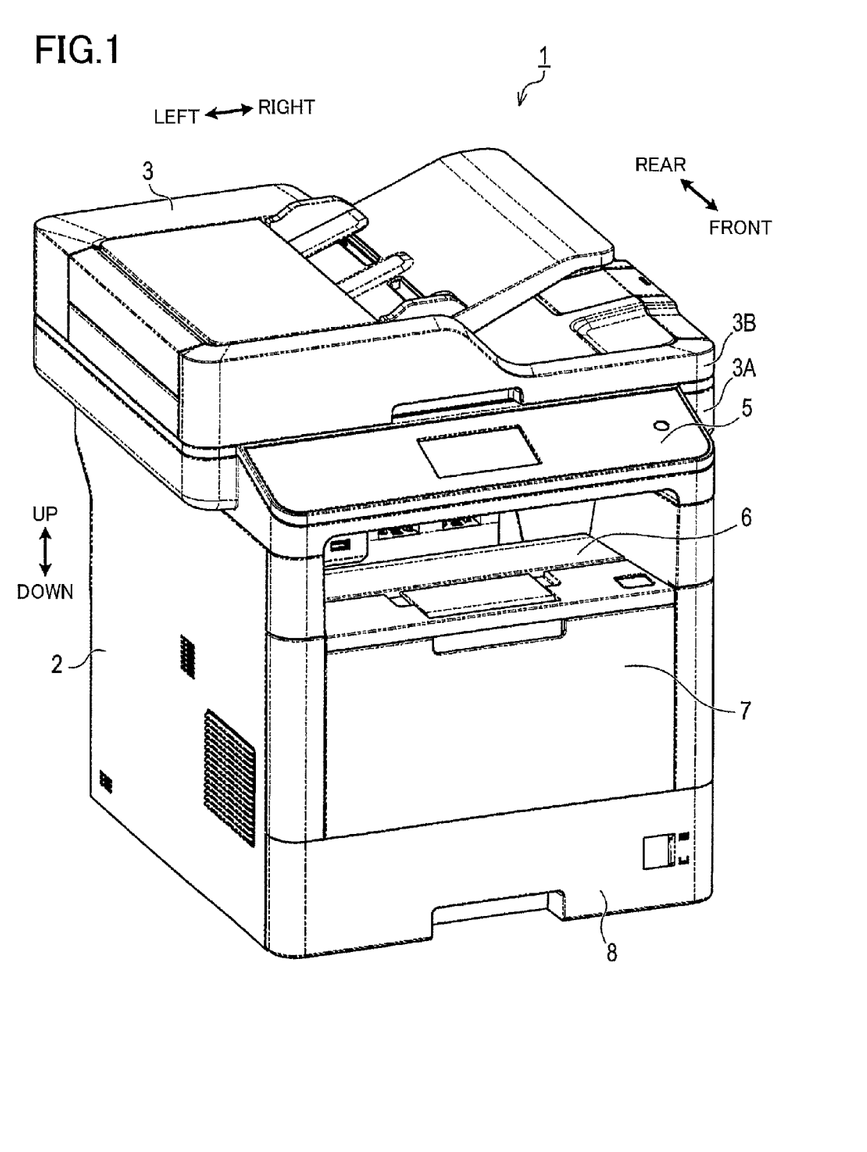
FIG. 1 is a perspective view of an external appearance of a multi-function peripheral (MFP)

FIG. 1 illustrates a multi-function peripheral (MFP) 1 includes a sheet conveyor and an image reader. In this description, the up and down direction is a direction perpendicular to the horizontal plane in a state in which the MFP 1 is installed on the horizontal plane. The front direction is a direction in which an operation panel 5, which will be described below, faces. The rear direction is opposite to the front direction. The right and left direction is defined in a state in which the MFP 1 is viewed from the front.

As illustrated in FIG. 1, the MFP 1 includes a main body unit 2 and a reading unit 3 as one example of the image reader. The main body unit 2 includes: a controller for controlling the MFP 1; an image forming device; and a LAN communication device. The reading unit 3 includes a flatbed unit 3A and an automatic document feeder (ADF) unit 3B as one example of the sheet conveyor. The flatbed unit 3A and the ADF unit 3B will be described later in detail.

The operation panel 5 is provided on a front surface of the MFP 1. The operation panel 5 is operable by a user. The operation panel 5 includes an input device and an output device. The user operates the input device to input various instructions to the MFP 1. The input device includes a touch screen, various buttons, and switches. The output device notifies the user of an operating state of the MFP 1, for example. The output device includes a liquid crystal display and various lamps.

A discharge tray 6 is provided under the operation panel 5. A recording medium, such as a sheet, on which an image is formed by the image forming device is discharged onto the discharge tray 6. An openable and closable front cover 7 is provided under the discharge tray 6. An open state of the front cover 7 allows the user to access the image forming device provided in the main body unit 2 to perform maintenance of the image forming device, for example. When an image is to be formed on a thick sheet or an envelope, for example, the front cover 7 is opened and used as a supply tray. A supply cassette 8 is mounted under the front cover 7. The supply cassette 8 stores sheets to be supplied to the image forming device.

Reading Unit

There will be next explained a construction of the reading unit 3. The reading unit 3 includes a first image sensor 11A and a second image sensor 11B, each of which is one example of an image reading device. The first image sensor 11A is provided in the flatbed unit 3A, and the second image sensor 11B is provided in the ADF unit 3B.

Each of the first image sensor 11A and the second image sensor 11B is a one-dimensional image sensor which includes a plurality of reading elements arranged in one direction. In the present embodiment, each of the first image sensor 11A and the second image sensor 11B is a contact image sensor (CIS). Each of the first image sensor 11A and the second image sensor 11B is configured such that a direction in which the reading elements are arranged (i.e., a main scanning direction) coincides with a direction perpendicular to each of the right and left direction and the up and down direction in FIG. 2. That is, the direction of the arrangement coincides with the front and rear direction.

The reading unit 3 includes a flatbed (FB) platen 12, a first ADF platen 13A, and a second ADF platen 13B. The FB platen 12 and the first ADF platen 13A is provided in the flatbed unit 3A, and the second ADF platen 13B is provided in the ADF unit 3B. Each of the FB platen 12, the first ADF platen 13A, and the second ADF platen 13B is constituted by a transparent plate such as a glass plate or an acrylic plate.

The flatbed unit 3A includes a guide rail 14, a carriage 15, and an endless toothed belt 16. The guide rail 14 extends in the right and left direction in FIG. 2 in parallel with lower surfaces of the FB platen 12 and the first ADF platen 13A.

The carriage 15 is mounted on the guide rail 14 and thereby supported so as to be reciprocable in the right and left direction along the guide rail 14. The carriage 15 is coupled to the endless toothed belt 16. The endless toothed belt 16 is rotated in forward and reverse directions by a motor, not illustrated. During this rotation, the carriage 15 is reciprocated in the right and left direction, following the endless toothed belt 16. The first image sensor 11A is mounted on the carriage 15 in a state in which the reading elements are oriented in the up direction in FIG. 2 so as to face the FB platen 12 and the first ADF platen 13A.

Figure 2:
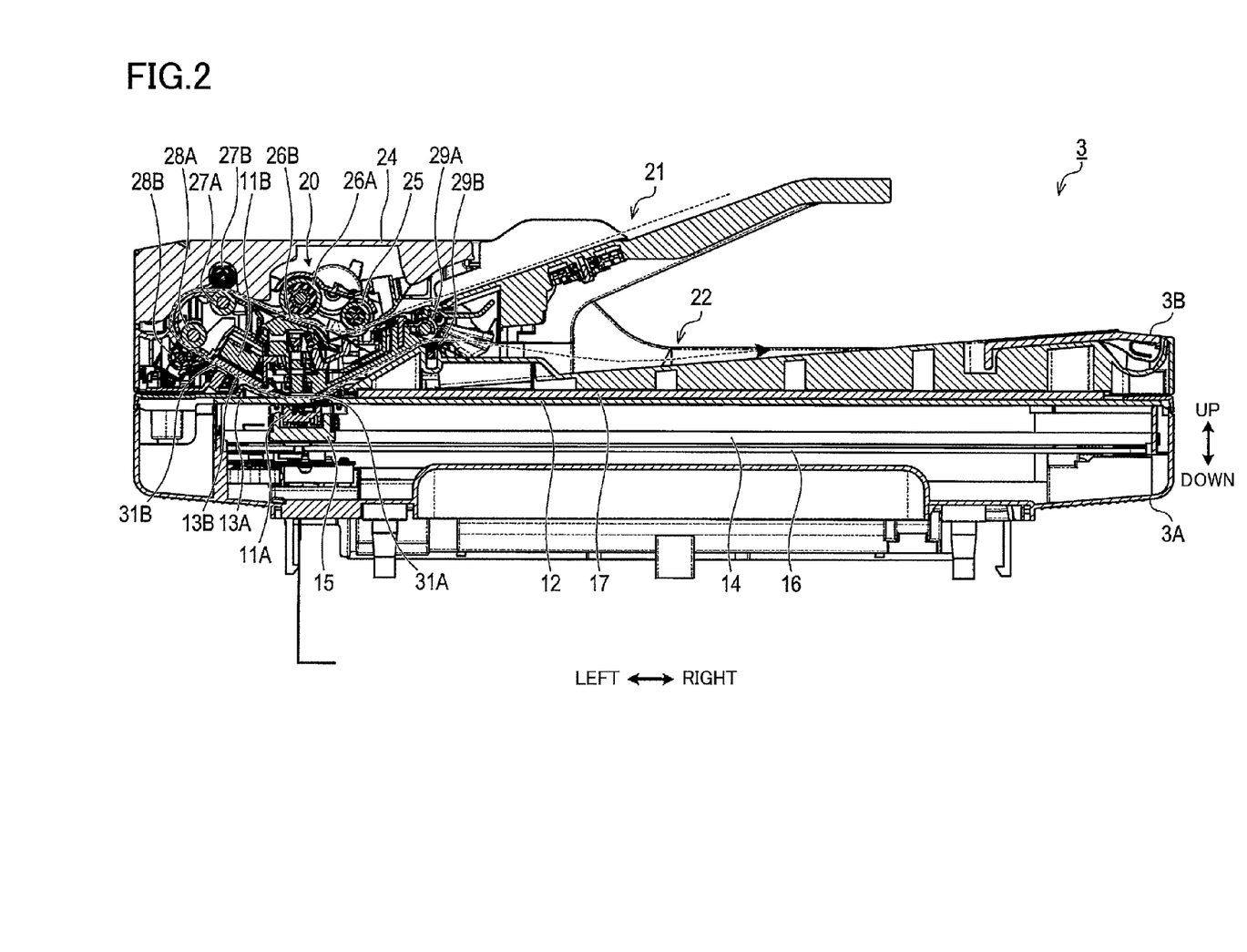
FIG. 2 is a cross-sectional view of a central portion of the MFP illustrating a reading unit.

The ADF unit 3B includes a holder 17. The holder 17 is a stacked body including a resin foam layer and a hard resin film layer. In a closed state of the ADF unit 3B with a reading object placed on the FB platen 12, the holder 17 is held in close contact with the FB platen 12 with slight elastic deformation so as to press the reading object onto the FB platen 12. Examples of the reading object include a sheet and a book.

When reading an image formed on the reading object placed on an upper surface of the FB platen 12, the first image sensor 11A reads the image while being moved with the carriage 15 in a direction (a sub-scanning direction) perpendicular to the direction of the arrangement of the reading elements (the main scanning direction).

As illustrated in FIG. 2, the ADF unit 3B includes a conveyor 20 which conveys a sheet along a conveyance path indicated by the broken line in FIG. 2. A supply sheet supporter 21 is provided upstream of the conveyor 20 in a conveying direction in which the sheet is conveyed. The supply sheet supporter 21 supports sheets to be supplied to the conveyor 20. A discharged sheet supporter 22 is provided downstream of the conveyor 20 in the conveying direction. The discharged sheet supporter 22 supports sheets discharged by the conveyor 20.

The conveyor 20 includes supply rollers 25, separating rollers 26A, a separating piece 26B, first conveying rollers 27A, first pinch rollers 27B, second conveying rollers 28A (each as one example of a drive roller), second pinch rollers 28B (each as one example of a driven roller), discharge rollers 29A, and discharge pinch rollers 29B. The first pinch rollers 27B are respectively urged toward the first conveying rollers 27A by springs, not illustrated. The second pinch rollers 28B are respectively urged toward the second conveying rollers 28A by springs, not illustrated. The discharge pinch rollers 29B are respectively urged by the discharge rollers 29A by springs, not illustrated.

The sheets placed on the supply sheet supporter 21 are supplied downstream in the conveying direction from the supply sheet supporter 21 by the supply rollers 25 and separated one by one by the separating rollers 26A and the separating piece 26B. The sheet is conveyed downstream in the conveying direction by the first conveying rollers 27A and the second conveying rollers 28A and discharged onto the discharged sheet supporter 22 by the discharge rollers 29A.

The first ADF platen 13A is provided near a lowermost portion of the conveyance path. A first sheet presser 31A is provided such that the first sheet presser 31A and the first ADF platen 13A are opposed to each other with the conveyance path interposed therebetween. The first sheet presser 31A is located above the first ADF platen 13A. The second ADF platen 13B is provided over a portion of the conveyance path which extends obliquely downward from the second conveying rollers 28A toward the first ADF platen 13A. A second sheet presser 31B is provided such that the second sheet presser 31B and the second ADF platen 13B are opposed to each other with the conveyance path interposed therebetween. The second sheet presser 31B is located obliquely to the lower left of the second ADF platen 13B.

The first sheet presser 31A is urged toward the first ADF platen 13A by an urging force that does not interfere with conveyance of the sheet. This construction prevents the sheet from floating from the first ADF platen 13A when the sheet conveyed between the first ADF platen 13A and the first sheet presser 31A while contacting an upper surface of the first ADF platen 13A.

The second sheet presser 31B is urged toward the second ADF platen 13B by an urging force that does not interfere with conveyance of the sheet. This construction prevents the sheet from floating from the second ADF platen 13B when the sheet conveyed between the second ADF platen 13B and the second sheet presser 31B while contacting an upper surface of the second ADF platen 13B.

When reading an image formed on the sheet conveyed by the conveyor 20, the first image sensor 11A is positioned at a position opposed to the first sheet presser 31A with the first ADF platen 13A interposed therebetween. At this position, the first image sensor 11A reads the image formed on the sheet that is conveyed while contacting the upper surface of the first ADF platen 13A. The second image sensor 11B is provided such that the second image sensor 11B and the second sheet presser 31B are opposed to each other with the second ADF platen 13B interposed therebetween. The second image sensor 11B reads an image formed on the sheet conveyed while contacting a lower surface of the second ADF platen 13B.

Intermediate Bearing

Figure 3:
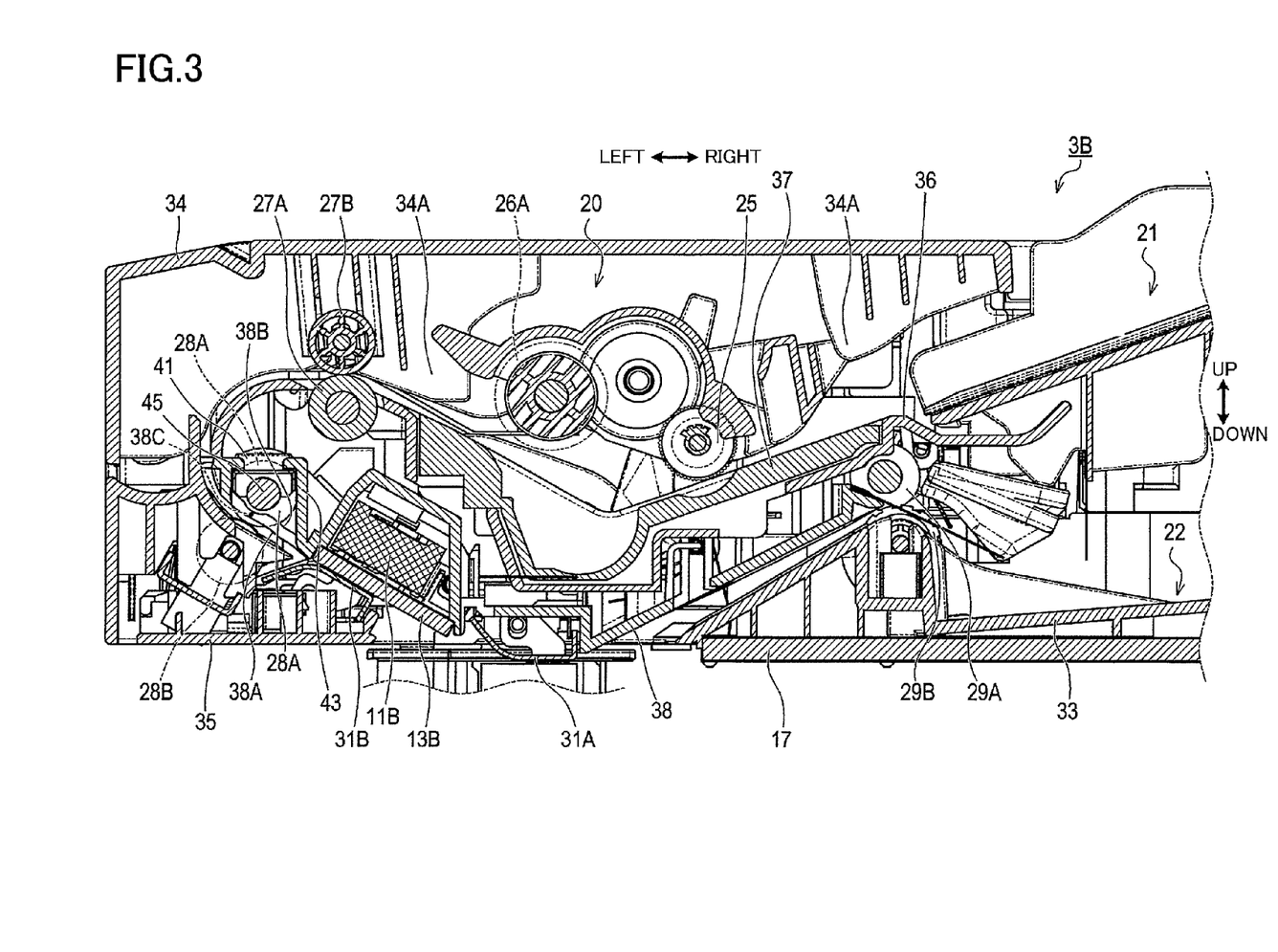
FIG. 3 is an enlarged elevational view in vertical cross section principally illustrating a conveyor.

As illustrated in FIG. 3, the ADF unit 3B includes a ADF base 33, an upper cover 34, a lower cover 35, a first chute 36, a second chute 37, and a third chute 38 as one example of a chute. These components are provided near the conveyor 20 so as to define a space serving as the conveyance path.

The ADF base 33 serves as a bottom portion of the ADF unit 3B. A left portion of the ADF base 33 supports the conveyor 20, and a right portion of the ADF based 33 serves as the discharged sheet supporter 22.

The upper cover 34 is mounted so as to be opened and closed with respect to the ADF base 33. Specifically, the upper cover 34 is pivotable about a pivot axis, not illustrated, extending in the front and rear direction. In a closed state of the upper cover 34, a surface of the upper cover 34 which is opposed to the conveyor 20 defines the uppermost position of the conveyance path within an area extending from a position located upstream of the supply rollers 25 in the conveying direction to a position located between the first conveying rollers 27A and the second conveying rollers 28A. Specifically, the surface of the upper cover 34 which is opposed to the conveyor 20 is provided with a plurality of ribs 34A protruding toward the conveyor 20. The ribs 34A extend in the conveying direction, and lower ends of the respective ribs 34A define the uppermost position of the conveyance path. In the event of a sheet jam in the conveyance path just under the upper cover 34, the user may open the upper cover 34 to remove the jammed sheet. It is noted that a left end of the conveyance path is defined by an extending portion of the ADF base 33 within an area from a position located between the first conveying rollers 27A and the second conveying rollers 28A to a position located near the second conveying rollers 28A.

The lower cover 35 is provided on a left end portion of a bottom portion of the ADF base 33. The lower cover 35 is mounted so as to be opened and closed with respect to the ADF base 33. Specifically, the lower cover 35 is pivotable about a pivot axis, not illustrated, extending in the front and rear direction. The second sheet presser 31B is also provided on the lower cover 35. In the event of a sheet jam in the conveyance path just above the lower cover 35, the user may open the lower cover 35 to move the second sheet presser 31B away from the conveyance path to remove the jammed sheet.

The first chute 36, the second chute 37, and the third chute 38 are fixed to a component fixed to the ADF base 33 or the ADF base 33. The first chute 36 and the second chute 37 define the lowermost position of the conveyance path within an area extending from a position located upstream of the supply rollers 25 in the conveying direction to a position located between the first conveying rollers 27A and the second conveying rollers 28A.

The third chute 38 is provided below the first chute 36 and the second chute 37. The third chute 38 defines the uppermost position of the conveyance path within an area extending from a position located between the first conveying rollers 27A and the second conveying rollers 28A to a position near the discharge rollers 29A. It is noted that the lowermost position of the conveyance path is defined by the ADF base 33 within an area extending from a position located downstream of the first sheet presser 31A in the conveying direction to the position near the discharge rollers 29A. The third chute 38 has opposite surfaces, namely, a first surface 38A and a second surface 38B. The first surface 38A defines the conveyance path and guides the sheet conveyed from the upstream in the conveying direction, toward the downstream in the conveying direction along the first surface 38A.

An intermediate bearing 41 is mounted on the third chute 38 so as to be opposed to the second surface 38B of the third chute 38. The second surface 38B of the third chute 38 is provided with a holder 43 capable of holding the intermediate bearing 41 at a position where the intermediate bearing 41 is provided. The intermediate bearing 41 held by the holder 43 is held in contact with an outer circumferential surface of a drive shaft 45 for rotating the second conveying rollers 28A.

Figures 4A, 4B:
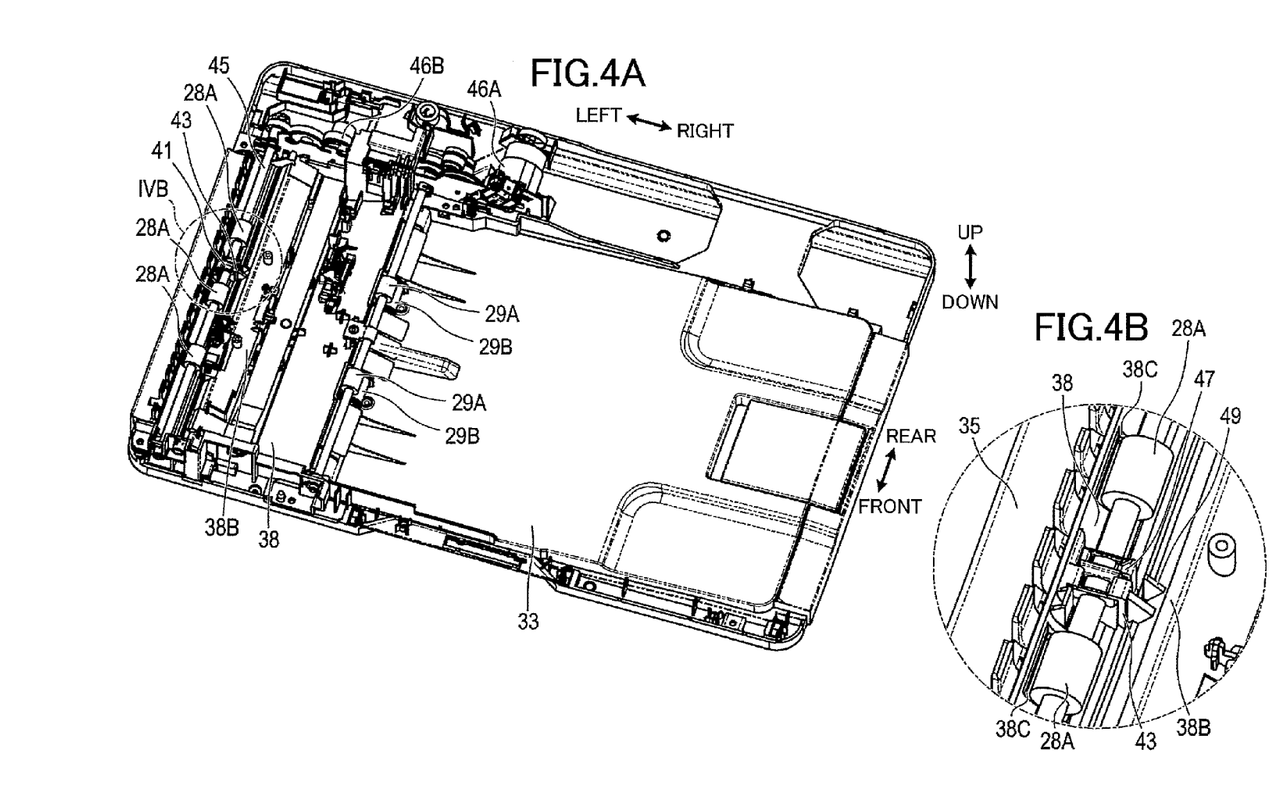
FIG. 4A is a perspective view of components including an ADF base, a chute, and a drive roller.
FIG. 4B is an enlarged view of the area IVB in FIG. 4A.

As illustrated in FIG. 4A, the ADF base 33 is provided with a motor 46A and a power transmitting mechanism 46B which transmits power from the motor 46A to the drive shaft 45. In the present embodiment, the power transmitting mechanism 46B is a gear mechanism including a plurality of gears. When the drive shaft 45 is rotated by power transmitted from the motor 46A to the drive shaft 45 via the power transmitting mechanism 46B, the drive shaft 45 is rotated in contact with the intermediate bearing 41. Thus, the intermediate bearing 41 is formed of resin that enables smooth sliding of the intermediate bearing 41. Examples of the resin include polyacetal resin and polyamide resin.

As illustrated in FIGS. 4A and 4B, the intermediate bearing 41 and the holder 43 are provided in the vicinity of a center of the ADF base 33 in the front and rear direction. The vicinity of the center of the ADF base 33 in the front and rear direction is one example of a first position. In the present embodiment, the three second conveying rollers 28A are mounted on the drive shaft 45 respectively at positions spaced apart from each other in the front and rear direction (as one example of a first direction). In the present embodiment, the intermediate bearing 41 and the holder 43 are provided between adjacent two of the second conveying rollers 28A. Specifically, the intermediate bearing 41 and the holder 43 are provided between the second and third rollers 28A from the front in FIGS. 4A and 4B.

The third chute 38 has three openings 38C, only two of which are illustrated in FIG. 4B. The openings 38 extend through the third chute 38 between the first surface 38A and the second surface 38B. The openings 38 are formed respectively at positions spaced apart from each other in the front and rear direction perpendicular to the sheet conveying direction. Specifically, the openings 38C are formed at the positions respectively corresponding to the three second conveying rollers 28A. The rotation center of the drive shaft 45 extends along the second surface 38B in the front and rear direction. The three second conveying rollers 28A are respectively positioned in the openings 38C from the second surface 38B and partly protrude from the first surface 38A (see FIG. 3).

The second pinch rollers 28B are provided at positions respectively corresponding to the three second conveying rollers 28A. The rotation center of the second pinch rollers 28B extends along the first surface 38A in the front and rear direction. An outer circumferential surface of each of the second pinch rollers 28B is in contact with an outer circumferential surface of a corresponding one of the second conveying rollers 28A protruding from the first surface 38A. With this construction, the second pinch rollers 28B are rotated following the respective second conveying rollers 28A.

Figure 5A:
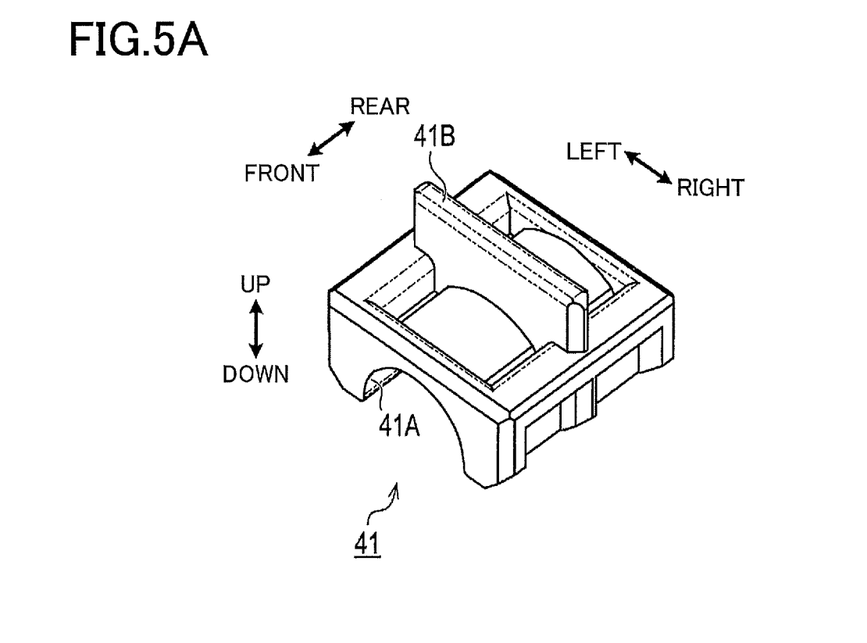
FIG. 5A is a perspective view of an intermediate bearing viewed from an upper front and right side thereof.
Figure 5B:
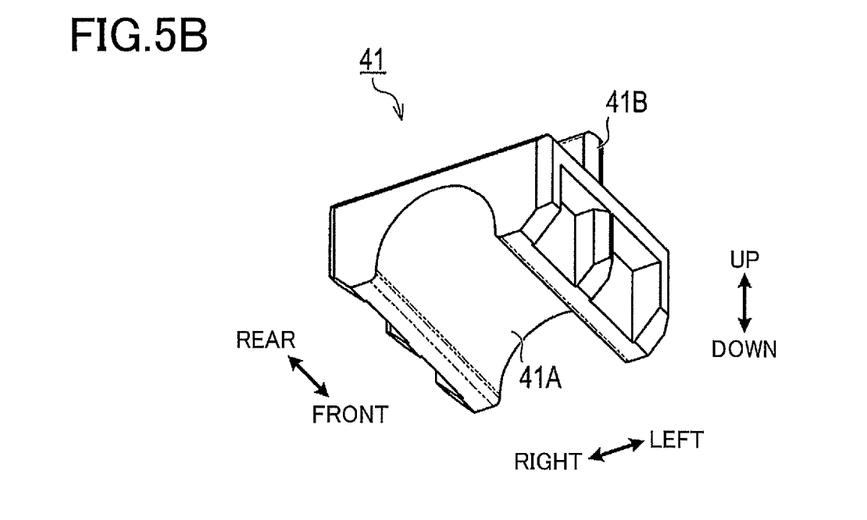
FIG. 5B is a perspective view of the intermediate bearing viewed from a lower rear and left side thereof.

As illustrated in FIGS. 5A and 5B, the intermediate bearing 41 includes a curved surface 41A and a protruding piece 41B. The curved surface 41A contacts the outer circumferential surface of the drive shaft 45. Specifically, the curved surface 41A contacts a circumferentially half portion of the outer circumferential surface of the drive shaft 45. The intermediate bearing 41 has such rotation symmetry that in the case where the intermediate bearing 41 is rotated 180 degrees about the axis extending in the up and down direction in FIGS. 5A and 5B, the intermediate bearing 41 is in the same shape (external appearance). Thus, when the intermediate bearing 41 is mounted on the holder 43, no problems arise even if the intermediate bearing 41 is reversed in the front and rear direction and the right and left direction in FIGS. 5A and 5B.

Figure 6A:
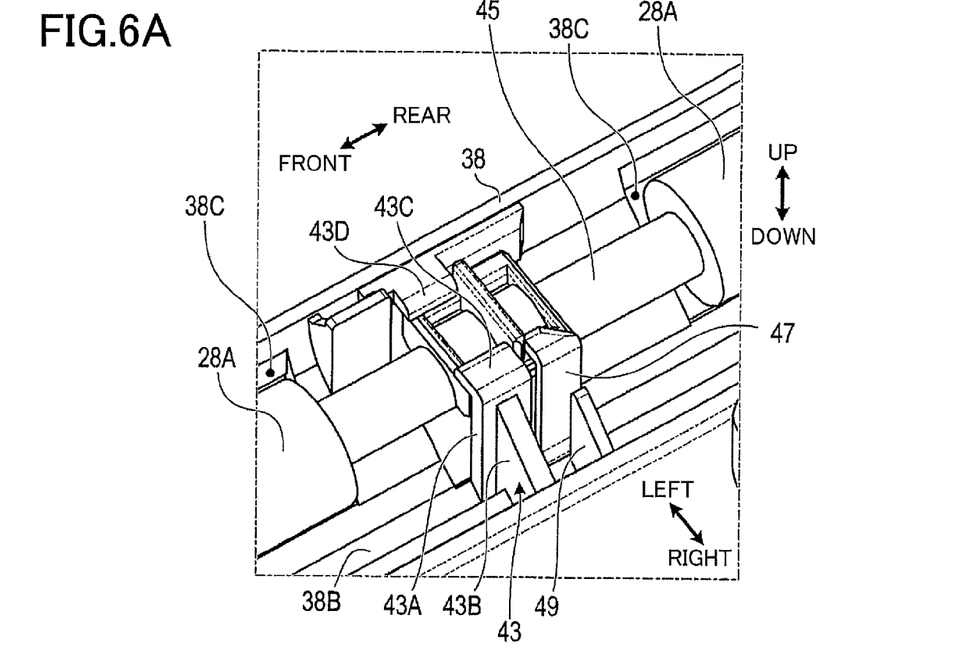
FIG. 6A is a perspective view of the intermediate bearing held by a holder which is viewed from an upper front and right side thereof.
Figure 6B:
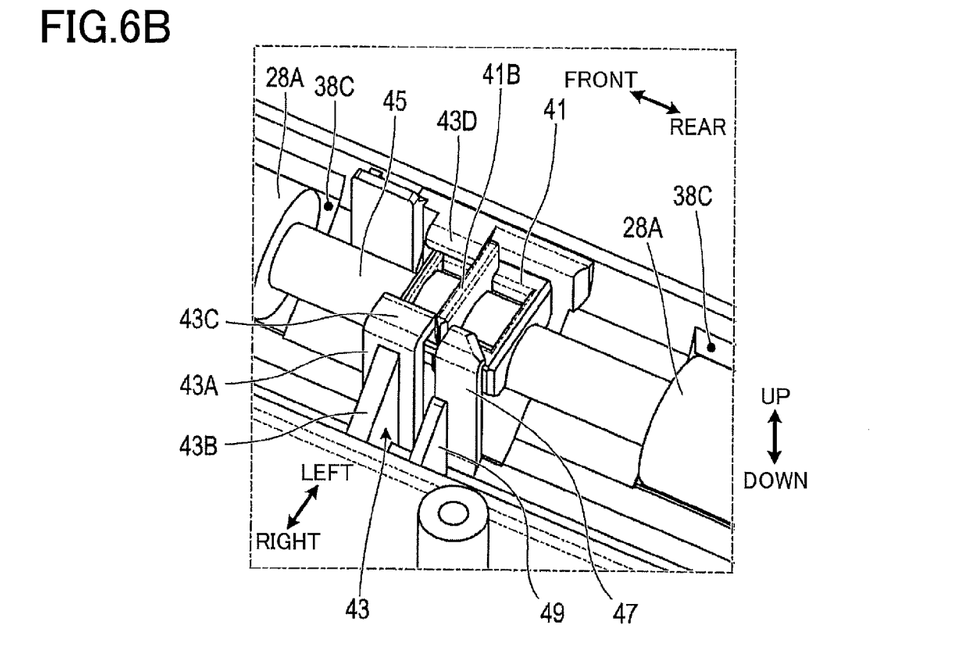
FIG. 6B is a perspective view of the intermediate bearing held by the holder which is viewed from an upper rear and right side thereof.

As illustrated in FIGS. 6A and 6B, the holder 43 includes an extending portion 43A, a reinforcement rib 43B, and a pair of engaging claws 43C, 43D each as one example of an engaging member. In the present embodiment, the extending portion 43A, the rib 43B, and the pair of engaging claws 43C, 43D are formed integrally with the third chute 38. The extending portion 43A is shaped like a plate extending upward from the second surface 38B of the third chute 38 (in a direction intersecting in the direction intersecting the second surface 38B). The rib 43B is also shaped like a plate extending upward from the second surface 38B of the third chute 38 (in the direction intersecting the second surface 38B). The rib 43B is provided so as to be perpendicular to a surface of the extending portion 43A which extends in the front and rear direction. The extending portion 43A and the rib 43B are coupled to each other. With this construction, the rib 43B inhibits movement of the extending portion 43A in the right and left direction. The extending portion 43A and the rib 43B provide high stiffness of the holder 43 which prevents the holder 43 from being deformed by a force assumed to be applied from the intermediate bearing 41. The engaging claw 43C extends leftward from an upper end of the extending portion 43A. The engaging claw 43D protrudes rightward from the second surface 38B of the third chute 38 toward the engaging claw 43C and is opposed to the engaging claw 43C. As a result, the engaging claws 43C, 43D limit movement of the intermediate bearing 41 in a direction directed from the second pinch rollers 28B toward the second conveying rollers 28A. The engaging claws 43C, 43D are engaged with an upper surface of the intermediate bearing 41 and thereby hold the intermediate bearing 41 at a position located between the drive shaft 45 and the engaging claws 43C, 43D. That is, a first distance is less than the dimension of the intermediate bearing 41 in a direction perpendicular to the axis of the drive shaft 45. It is noted that the engaging claw 43C and the engaging claw 43D are opposed to each other and spaced apart from each other at a particular distance, e.g., the first distance. This first distance is determined such that when the drive shaft 45 is mounted on the third chute 38, the drive shaft 45 may pass through the engaging claws 43C, 43D. That is, the first distance may be greater than or equal to the diameter of the drive shaft 45. Furthermore, the first distance may be determined such that the first distance is less than the diameter of the drive shaft 45 in the state in which the drive shaft 45 is mounted on the third chute 38 as illustrated in FIGS. 6A and 6B, but when the drive shaft 45 passes between the engaging claws 43C, 43D, the engaging claws 43C, 43D are elastically deformed respectively in directions away from each other, making the first distance temporarily equal to the diameter of the drive shaft 45.

Figure 7A:
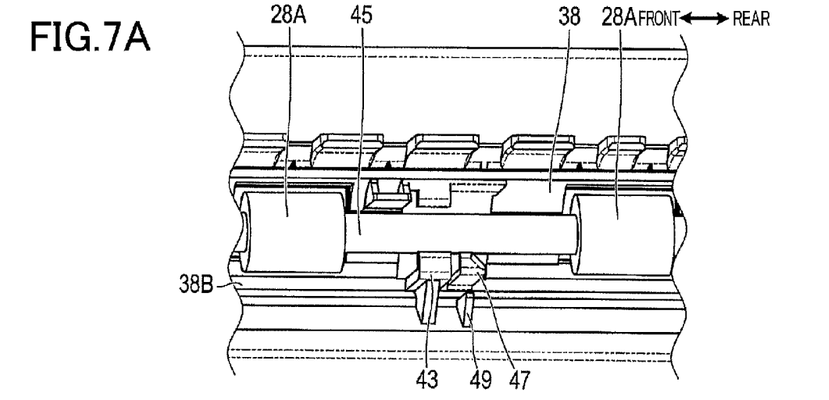
FIG. 7A is a view for explaining a state in which the intermediate bearing is not mounted.
Figure 7B:
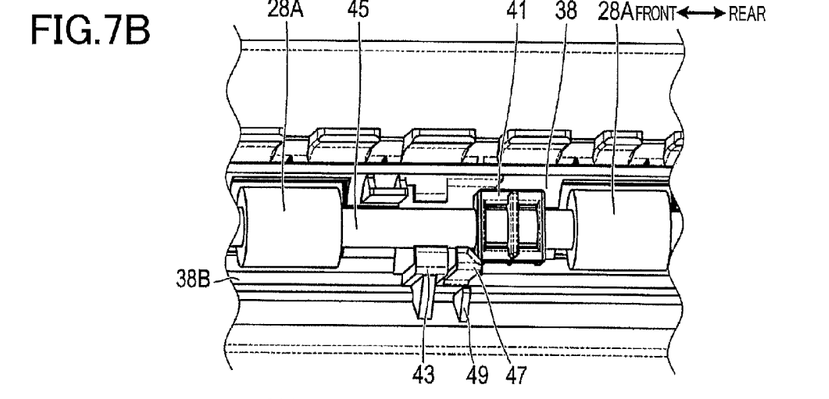
FIG. 7B is a view for explaining a state in which the intermediate bearing is located at a position where the intermediate bearing is in contact with a drive shaft.
Figure 7C:
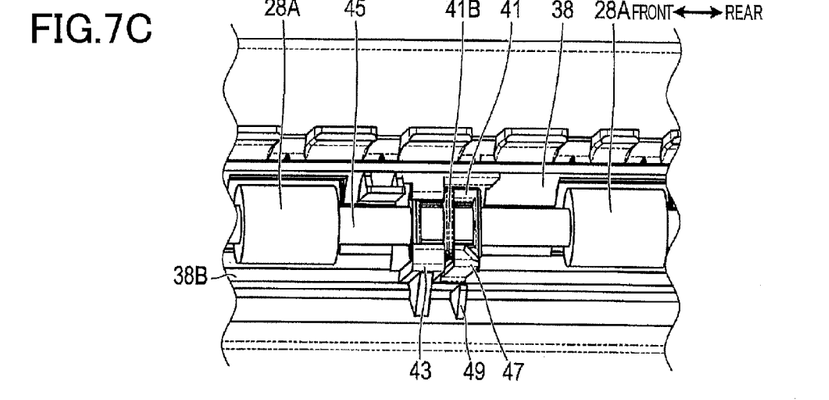
FIG. 7C is a view for explaining a state in which the intermediate bearing is located at a position where the intermediate bearing is held by the holder.

When the pressing force of the second pinch rollers 28B acts on the second conveying rollers 28A, the intermediate bearing 41 is held in contact with the outer circumferential surface of the drive shaft 45 and with the engaging claws 43C, 43D. The dimension of the intermediate bearing 41 in the up and down direction is designed to be slightly less than the distance between the outer circumferential surface of the drive shaft 45 and the engaging claws 43C, 43D in the up and down direction. Thus, in a state in which the pressing force of the second pinch rollers 28B does not act on the second conveying rollers 28A, a small space serving as a play is formed between the intermediate bearing 41 and at least one of the holder 43 and the drive shaft 45. This construction prevents occurrence of excessive frictional resistance between the intermediate bearing 41 and the drive shaft 45. As described above, the intermediate bearing 41 is located between the drive shaft 45 and the engaging claws 43C, 43D when the intermediate bearing 41 is located at the position at which the intermediate bearing 41 is held by the holder 43 (noted that this position is one example of the first position) as illustrated in FIGS. 6A and 6B. Also, as illustrated in FIGS. 7A-7C, the engaging claws 43C, 43D and the drive shaft 45 define a space for entrance of the intermediate bearing 41 when the intermediate bearing 41 is located at any position (as one example of a second position) other than the position at which the intermediate bearing 41 is held by the holder 43. The distance (the first distance) between the engaging claws 43C, 43D is less than the dimension of the intermediate bearing 41 in the direction perpendicular to the axis of the drive shaft 45. Thus, the intermediate bearing 41 is brought into contact with the outer circumferential surface of the drive shaft 45 at the second position, slid from the second position to the first position while contacting the outer circumferential surface of the drive shaft 45, and held by the engaging claws 43C, 43D of the holder 43 in a state in which the intermediate bearing 41 is positioned in the space.

A restrainer 47 is provided on the third chute 38 at a position near the holder 43 (at the rear of the extending portion 43A in FIGS. 6A and 6B). A stopper 49 is provided near the restrainer 47 (to the right of the restrainer 47 in FIGS. 6A and 6B). The restrainer 47 is shaped like a plate extending upward from the second surface 38B of the third chute 38 (in the direction intersecting the second surface 38B). The restrainer 47 and the extending portion 43A are provided side by side in the front and rear direction. The stopper 49 extends so as to be perpendicular to a surface of the restrainer 47 which extends in the front and rear direction. A space is formed between the restrainer 47 and the stopper 49. The restrainer 47 is elastically deformable in the right and left direction, and an upper end of the restrainer 47 is moved rightward with elastic deformation of the restrainer 47 in FIGS. 6A and 6B. When the upper end of the restrainer 47 is moved rightward by a certain distance, however, the restrainer 47 is brought into contact with the stopper 49, and accordingly the stopper 49 prevents further movement of the restrainer 47.

As illustrated in FIGS. 7A-7C, when the intermediate bearing 41 is located at the position at which the intermediate bearing 41 is not held by the holder 43 (as one example of the second position), the intermediate bearing 41 is brought into contact with the outer circumferential surface of the drive shaft 45 and then slid frontward along the drive shaft 45, so that the intermediate bearing 41 is positioned to the position (as one example of the first position) at which the intermediate bearing 41 is held by the holder 43. Specifically, FIG. 7A illustrates a state in which the intermediate bearing 41 has not been mounted. When a user mounts the intermediate bearing 41 in this state, as illustrated in FIG. 7B, the intermediate bearing 41 is brought into contact with the outer circumferential surface of the drive shaft 45 at a position located to the rear of the restrainer 47 in FIG. 7B (that is, when the intermediate bearing 41 is located at the second position).

When the intermediate bearing 41 is slid frontward along the outer circumferential surface of the drive shaft 45 in this state, the restrainer 47 is elastically deformed by a force applied from the intermediate bearing 41, during the sliding of the intermediate bearing 41 to the position at which the intermediate bearing 41 is held by the holder 43. As a result, the restrainer 47 is moved to a position at which the restrainer 47 does not interfere with the sliding of the intermediate bearing 41.

When the intermediate bearing 41 reaches the position at which the intermediate bearing 41 is held by the holder 43, the elastically deformed restrainer 47 is returned to its original shape. As a result, as illustrated in FIG. 7C, the restrainer 47 is engaged with the protruding piece 41B of the intermediate bearing 41. Specifically, a portion of the restrainer 47 which protrudes from its upper end is brought into contact with a surface of the protruding piece 41B which extends in the right and left direction. In this state, the restrainer 47 restrains sliding of the intermediate bearing 41 in a direction in which the intermediate bearing 41 is disengaged from the holder 43. A front surface of the protruding piece 41B which is located farther from the restrainer 47 than a rear surface of the protruding piece 41B is in contact with the engaging claws 43C, 43D, so that the intermediate bearing 41 is positioned.

Effects

In the MFP 1 as described above, the intermediate bearing 41 is held by the holder 43 provided on the third chute 38 and held in contact with the outer circumferential surface of the drive shaft 45, thereby determining positions of the drive shaft 45 and the third chute 38 relative to each other. Thus, when compared with the case where the intermediate bearing 41 is not provided, the drive shaft 45 and the third chute 38 suppress each other's deformation, the drive shaft 45 is not easily bent, and the third chute 38 is not easily distorted.

Furthermore, even if the drive shaft 45 and/or the third chute 38 is slightly bent or distorted, the drive shaft 45 and the third chute 38 are deformed without change in their relative positions, thereby reducing positional misalignment of the second conveying rollers 28A and the first surface 38A relative to each other. Thus, even in the case where the second conveying rollers 28A and the drive shaft 45 are urged by the pressing force applied from the second pinch rollers 28B to the second conveying rollers 28A, for example, it is possible to prevent displacement of the rotation center of the drive shaft 45 relative to the third chute 38. This construction prevents that an amount of protrusion of the second conveying rollers 28A from the first surface 38A becomes excessively large or small due to bending or distortion of the drive shaft 45 and/or the third chute 38. Accordingly, when compared with the case where the intermediate bearing 41 is not provided, the amount of protrusion of the second conveying rollers 28A from the first surface 38A is kept appropriate, enabling stable sheet conveyance.

The intermediate bearing 41 may be slid in the front and rear direction along the drive shaft 45 to the position at which the intermediate bearing 41 is held by the holder 43. This construction provides a simple procedure of mounting of the intermediate bearing 41 when compared with an intermediate bearing that requires an assembling procedure which is more complicated than the sliding of the intermediate bearing 41 in this MFP 1. When the second conveying rollers 28A and the drive shaft 45 are urged by the pressing force applied from the second pinch rollers 28B to the second conveying rollers 28A, the urging force acts in the direction perpendicular to the front and rear direction. Thus, even when the urging force is applied to the intermediate bearing 41, the intermediate bearing 41 is not easily slid in the front and rear direction, making it difficult for the intermediate bearing 41 to be disengaged from the holder 43.

In the above-described MFP 1, the curved surface 41A of the intermediate bearing 41 contacts the outer circumferential surface of the drive shaft 45. Thus, unlike a construction in which the curved surface 41A contacts a portion of the outer circumferential surface of the drive shaft 45, which portion is larger than its circumferentially half portion, the intermediate bearing 41 may be easily positioned at the position at which the intermediate bearing 41 contacts the outer circumferential surface of the drive shaft 45, facilitating assembly using sliding.

In the above-described MFP 1, the restrainer 47 may prevent disengagement of the intermediate bearing 41 from the holder 43. This construction eliminates the need of independent fastening devices and adhesives for preventing disengagement of the intermediate bearing 41 from the holder 43.

In the above-described MFP 1, the restrainer 47 is elastically deformed to allow the sliding of the intermediate bearing 41 in the middle of the sliding of the intermediate bearing 41 to the position at which the intermediate bearing 41 is held by the holder 43. After the intermediate bearing 41 is held by the holder 43, the deformed restrainer 47 is returned to its original shape to prevent sliding of the intermediate bearing 41 in the direction in which the intermediate bearing 41 is disengaged from the holder 43. Accordingly, the use of the restrainer 47 enables appropriate holding of the intermediate bearing 41.

In the above-described MFP 1, the holder 43 is not deformed by the force applied from the intermediate bearing 41. Thus, even though the restrainer 47 is elastically deformable, the intermediate bearing 41 is held at the appropriate position.

In the above-described MFP 1, the stopper 49 prevents the further movement of the restrainer 47 from the position at which the restrainer 47 contacts the stopper 49. This construction prevents excessive deformation of the restrainer 47, preventing damage to the restrainer 47 due to the excessive deformation.

In the above-described MFP 1, the holder 43 includes the extending portion 43A and the rib 43B. Accordingly, the holder 43 is high in flexural rigidity and not easily deformed.

In the above-described MFP 1, the protruding piece 41B, the restrainer 47, and the holder 43 are cooperated to prevent sliding of the intermediate bearing 41 in the front and rear direction.

In the above-described MFP 1, the space as described above is formed between the intermediate bearing 41 and the at least one of the holder 43 and the drive shaft 45. When compared with the case of absence of the space, it is possible to reduce frictional resistance acting between the intermediate bearing 41 and the drive shaft 45, resulting in reduction in load imposed on the motor for driving the drive shaft 45.

In the above-described MFP 1, the intermediate bearing 41 has the rotation symmetry described above. When compared with an intermediate bearing not having the rotation symmetry, it is possible to reduce a possibility of error in direction in which the intermediate bearing 41 is mounted.

Modifications

While the embodiment has been described above, it is to be understood that the disclosure is not limited to the details of the illustrated embodiment, but may be embodied with various changes and modifications, which may occur to those skilled in the art, without departing from the spirit and scope of the disclosure.

For example, while the reading unit 3 as one example of the image reader and the ADF unit 3B as one example of the sheet conveyor are provided in the MFP 1 in the above-described embodiment, the present disclosure may be applied to a reading device constructed as an image scanner device having only a reading function.

The curved surface 41A of the intermediate bearing 41 contacts the circumferentially half portion of the outer circumferential surface of the drive shaft 45 in the above-described embodiment but may contact a portion of the outer circumferential surface of the drive shaft 45, which portion is larger than or smaller than the circumferentially half portion.

In the above-described embodiment, the restrainer 47 is used to prevent disengagement of the intermediate bearing 41 from the holder 43. However, another means such as independent fastening devices and adhesives may be used to prevent disengagement of the intermediate bearing 41 from the holder 43.

The stopper 49 is provided in the above-described embodiment but may not be provided. The stopper 49 has the shape illustrated in the figures in the above-described embodiment, but the shape of the stopper 49 is not limited in particular. While the stopper 49 is formed integrally with the second surface 38B of the third chute 38 in the above-described embodiment, the stopper 49 and the third chute 38 may be independent of each other such that the stopper 49 is fixed to the third chute 38.

The holder 43 includes the extending portion 43A and the rib 43B and thereby has high stiffness in the above-described embodiment but may not include the extending portion 43A and the rib 43B.

The intermediate bearing 41 has the rotation symmetry in the above-described embodiment but may not have the rotation symmetry. In the above-described embodiment, the first direction is the front and rear direction, but the MFP 1 may be configured such that the first direction coincides with the right and left direction, with the operation panel is provided on the front portion of the MFP 1.

What is claimed is:

1. A sheet conveyor, comprising:
    a chute comprising a first surface and a second surface facing respectively in mutually opposite directions, the chute comprising a plurality of openings formed through the first surface and the second surface and spaced apart from each other in a first direction perpendicular to a conveying direction, the chute being configured to guide a sheet conveyed from an upstream in the conveying direction, toward a downstream in the conveying direction along the first surface;
    a drive shaft that is rotated about a rotation axis extending in the first direction;
    a plurality of drive rollers each mounted on the drive shaft, the plurality of drive rollers facing the second surface of the chute, the plurality of drive rollers each partly protruding from the first surface of the chute through a corresponding one of the plurality of openings;
    a plurality of driven rollers each of which is rotated about a rotation axis extending in the first direction, the plurality of driven rollers each being urged toward a corresponding one of the plurality of drive rollers, the plurality of driven rollers each being contactable with the corresponding one of the plurality of drive rollers which protrudes from the first surface of the chute;

an intermediate bearing disposed at a first position located between two drive rollers of the plurality of drive rollers, the two drive rollers being adjacent to each other in the first direction; and a holder provided on the chute and configured to hold the intermediate bearing located at the first position, the intermediate bearing being in contact with an outer circumferential surface of the drive shaft when located at a second position different from the first position, the intermediate bearing being slid from the second position to the first position in the first direction and held by the holder at the first position.

2. The sheet conveyor according to claim 1, wherein the intermediate bearing comprises a curved surface contactable with a circumferentially half portion of the outer circumferential surface of the drive shaft.

3. The sheet conveyor according to claim 1, wherein the chute further comprises a restrainer configured to restrain movement of the intermediate bearing from the first position to the second position.

4. The sheet conveyor according to claim 3, wherein the restrainer is configured to restrain the movement of the intermediate bearing by being engaged with a portion of the intermediate bearing.

5. The sheet conveyor according to claim 3, wherein the restrainer is elastically deformed by a force applied from the intermediate bearing during sliding of the intermediate bearing from the second position to the first position so as to be moved to a position at which the restrainer does not interfere with the sliding of the intermediate bearing, and wherein when the intermediate bearing reaches the first position, the restrainer is switched from a state in which the restrainer is elastically deformed to a state in which the restrainer restrains the sliding of the intermediate bearing.

6. The sheet conveyor according to claim 1, wherein the holder is not deformed by a force applied from the intermediate bearing.

7. The sheet conveyor according to claim 5, wherein the chute further comprises a stopper spaced apart from the restrainer in a state in which the restrainer is not elastically deformed, and wherein the stopper is in contact with the restrainer to restrain further deformation of the restrainer in the state in which the restrainer is elastically deformed.

8. The sheet conveyor according to claim 1, wherein the holder comprises:

an extending portion having a plate shape extending from the second surface of the chute in a direction intersecting the second surface; and a rib having a plate shape extending from the second surface of the chute in the direction intersecting the second surface, the rib being perpendicular to the extending portion.

9. The sheet conveyor according to claim 3, wherein the intermediate bearing comprises a protruding piece configured to prevent sliding of the intermediate bearing over the first position after the intermediate bearing is slid from the second position and reaches the first position.

10. The sheet conveyor according to claim 9, wherein the protruding piece is disposed between the restrainer and the holder.

11. The sheet conveyor according to claim 1, wherein a space serving as a play is formed between the intermediate bearing and at least one of the holder and the drive shaft in a state in which a pressing force applied from each of the plurality of driven rollers does not act on the corresponding one of the plurality of drive rollers.

12. The sheet conveyor according to claim 1, wherein the intermediate bearing has a shape having such rotation symmetry that when the intermediate bearing is rotated 180 degrees about an axis extending in a direction perpendicular to the first direction, the intermediate bearing has a shape identical to that of the intermediate bearing before the intermediate bearing is rotated.

13. The sheet conveyor according to claim 1, wherein the holder comprises an engaging member that is engaged with the intermediate bearing located at the first position to restrain movement of the intermediate bearing in a direction directed from the plurality of driven rollers toward the plurality of drive rollers.

14. The sheet conveyor according to claim 13, wherein the engaging member is formed integrally with the chute.

15. The sheet conveyor according to claim 13, wherein when located at the first position, the intermediate bearing is located between the engaging member and the drive shaft.

16. The sheet conveyor according to claim 13, wherein the holder comprises a plurality of engaging claws as the engaging member which are spaced apart from each other in a second direction perpendicular to the first direction at a first distance that is less than a dimension of the intermediate bearing in the second direction, and wherein the first distance is greater than or equal to a diameter of the drive shaft.

17. An image reader, comprising:

a sheet conveyor configured to convey a sheet along a conveyance path; and an image reading device configured to read an image formed on the sheet conveyed by the sheet conveyor, the sheet conveyor comprising:

a chute comprising a first surface and a second surface facing respectively in mutually opposite directions, the chute comprising a plurality of openings formed through the first surface and the second surface and spaced apart from each other in a first direction perpendicular to a conveying direction, the chute being configured to guide a sheet conveyed from an upstream in the conveying direction, toward a downstream in the conveying direction along the first surface;

a drive shaft that is rotated about a rotation axis extending in the first direction;

a plurality of drive rollers each mounted on the drive shaft, the plurality of drive rollers facing the second surface of the chute, the plurality of drive rollers each partly protruding from the first surface of the chute through a corresponding one of the plurality of openings;

a plurality of driven rollers each of which is rotated about a rotation axis extending in the first direction, the plurality of driven rollers each being urged toward a corresponding one of the plurality of drive rollers, the plurality of driven rollers each being contactable with the corresponding one of the plurality of drive rollers which protrudes from the first surface of the chute;

an intermediate bearing disposed at a first position located between two drive rollers of the plurality of drive rollers, the two drive rollers being adjacent to each other in the first direction; and a holder provided on the chute and configured to hold the intermediate bearing located at the first position, the intermediate bearing being in contact with an outer circumferential surface of the drive shaft when located at a second position different from the first position, the intermediate bearing being slid from the second position to the first position in the first direction and held by the holder at the first position.

18. A sheet conveyor, comprising:

a drive shaft that is supported at opposite end portions thereof and rotated about a rotation axis extending in a first direction;

a drive roller mounted on the drive shaft;

a driven roller that is rotated about a rotation axis extending in the first direction, the driven roller being urged toward the drive roller, the driven roller being configured to cooperate with the drive roller to convey a sheet in a conveying direction, with the sheet nipped between the driven roller and the drive roller at a nipping position;

a chute provided upstream or downstream of the nipping position in the conveying direction, the chute being configured to guide the sheet being conveyed;

an intermediate bearing disposed at a first position located in a vicinity of a central portion of the drive shaft; and a holder provided on the chute and configured to hold the intermediate bearing located at the first position, the intermediate bearing being in contact with an outer circumferential surface of the drive shaft when located at a second position different from the first position in the first direction in which the rotation axis of the drive shaft extends, the intermediate bearing being slid from the second position to the first position and held by the holder at the first position.

* * * * *